Nov. 14, 1961   J. MÜLLER ET AL   3,008,729
TILTING CONTROL ARRANGEMENT FOR MOTOR VEHICLES
Filed Sept. 16, 1958
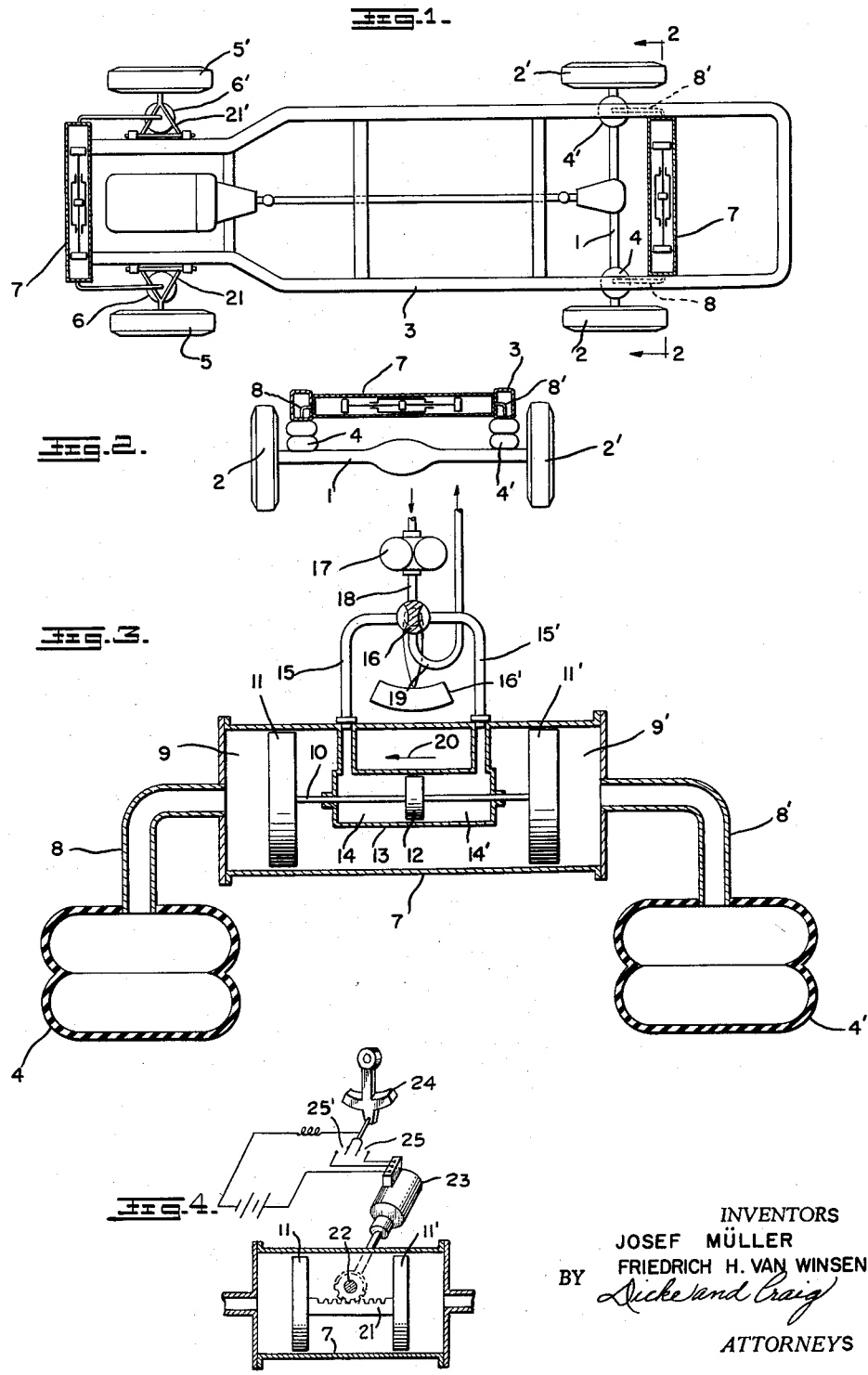
INVENTORS
JOSEF MÜLLER
FRIEDRICH H. VAN WINSEN
BY
ATTORNEYS United States Patent Office 3,008,729
Patented Nov. 14, 1961

3,008,729
TILTING CONTROL ARRANGEMENT FOR MOTOR VEHICLES
Josef Müller, Stuttgart-Riedenberg, and Friedrich H. van Winsen, Kirchheim (Teck), Germany, assignors to Daimler-Benz Aktiengesellschaft, Stuttgart-Unterturkheim, Germany
Filed Sept. 16, 1958, Ser. No. 761,326
Claims priority, application Germany Sept. 19, 1957
6 Claims. (Cl. 280—112)

The present invention relates to an installation for obtaining a positive curve inclination or tilting or a horizontal positioning of the vehicle body in motor vehicles in which the wheel axle members or wheel suspensions are spring supported with respect to the vehicle body by means of pneumatic springs.

The present invention essentially consists in that the pneumatic springs, preferably formed by spring bellows at each wheel axle, are connected with each other by means of a rigid air reservoir or tank and in that within each of the air reservoirs a movable partition wall is arranged which separates the pneumatic volume of the pneumatic spring located on one vehicle side from that of the pneumatic spring located on the other vehicle side, and which wall during traversal of or travelling through curves displaces by means of an auxiliary force, either selectively or especially also automatically in dependence on the extent of the centrifugal force acting on the vehicle body, the air volume or pneumatic volume present in the air reservoir and belonging to the pneumatic spring disposed on the outside of the curve either entirely or partially into this pneumatic spring which is disposed on the side of the vehicle corresponding to the outer side of the curve.

In contradistinction to the known installations of the prior art for purposes of achieving a positive curve inclination or tilting in motor vehicles provided with hydropneumatic spring systems in which the hydraulic medium is displaced and transported from the spring disposed on the inner side of the curve into the spring disposed on the outer side of the curve and in which, therefore, for purposes of achieving an inclination of the vehicle body, only the length of the hydraulic linkage is changed so that at the spring disposed on the outer side of the curve the spring height becomes smaller under the effect of the centrifugal force than at the spring disposed on the inner side of the curve, an installation is obtained in accordance with the present invention in such a manner that by the displacement of the pneumatic volume present in the air reservoir into the pneumatic spring disposed in the outer side of the curve without change in volume or increase in pressure an increase in length of the pneumatic spring takes place so that, under the influence of the centrifugal force in the curve, the original full length of the spring is automatically re-established again and, therefore, is available for complete spring movements.

According to a further feature of the present invention, the air reservoir or tank at each vehicle axle member may be constructed as a cylinder in operative communication on each side thereof with a respective one of the pneumatic springs while the partition wall separating from one another the pneumatic volumes of the two springs operatively connected with the same reservoir may be constructed as piston, preferably as a double-piston interconnected by means of a piston rod. The air tank or reservoir at each vehicle axle may thereby be constructed advantageously by a frame cross bearer of the vehicle. For purposes of actuating the double-piston, a displacing or adjusting piston arranged in an adjusting cylinder may be provided at the piston rod of the double-piston which adjusting piston is acted on by means of a hydraulic pressure medium for purposes of moving the double-piston in the one or the other direction.

According to still another feature in accordance with the present invention, the piston rod of the double-piston may also be constructed as a toothed rack with which a pinion engages which may be driven, for example, by means of an electric motor.

Accordingly, it is an object of the present invention to provide a control arrangement for controlling the inclination or tilting of the vehicle body, especially of motor vehicles provided with pneumatic springs, in which the length of the spring remains essentially the same while the vehicle traverses a curve.

Another object of the present invention is the provision of a control arrangement for pneumatic spring systems of motor vehicles which is operative to maintain the vehicle in a horizontal position or to provide a positive tilting thereof while travelling through curves and which is simple and rigid in construction and forms, at least in part, a portion of the vehicle frame thereby reinforcing the latter.

Still another object of the present invention is the provision of an automatic control system for the pneumatic spring of the vehicle which adjusts the vehicle body so as to maintain a horizontal position or to provide a positive tilting thereof during the traversal of curves and in which the original spring length will be re-established in the pneumatic spring disposed on the outside of the curve for purposes of making available the normal full length of such spring to enable the normal spring movements while passing through curves.

A still further object of the present invention resides in the provision of a pneumatic spring system adapted to maintain the vehicle in a predetermined position while passing through curves which makes it possible to utilize also the full spring stroke of each spring while passing through a curve.

These and other objects, features and advantages of the present invention will become more obvious from the following description when taken in connection with the accompanying drawing, which shows, for purposes of illustration only, two embodiments in accordance with the present invention, and wherein:

FIGURE 1 is a top plan view of a motor vehicle chassis and frame provided with a pneumatic spring system for spring supporting the wheel axle members or suspensions thereof in accordance with the present invention, FIGURE 2 is a cross sectional view taken along line 2—2 of FIGURE 1, FIGURE 3 is an enlarged cross sectional view through the actuating mechanism in accordance with the present invention for actuating the double-piston adapted to reciprocate in a cylinder serving as rigid air reservoir, and FIGURE 4 is a cross sectional view similar to FIGURE 3 but on a slightly smaller scale of a modified embodiment of the actuating mechanism for a double-piston in accordance with the present invention.

Referring now to the drawing, wherein like reference numerals are used throughout the various views to designate like parts, and more particularly to FIGURES 1 and 2 thereof, reference numeral 1 designates the rear axle of a motor vehicle. The rear axle 1, which may be of any suitable construction, for example a rigid axle member or swinging half axles, together with the wheels 2 and 2' mounted thereon is spring supported with respect to the frame 3 by means of pneumatic springs 4 and 4' consisting of spring bellows. The wheels 5 and 5' of the front axle, which may be suspended from the frame 3 by means of independent wheel suspensions including triangularly-shaped guide members 21 and 21' are spring supported with respect to the frame 3 by means of pneumatic springs 6 and 6' constructed in a manner essentially similar to the springs 4 and 4' of the rear wheels or rear axle 1. Essentially rigid air reservoirs or tanks 7 are arranged in proximity to the two pairs of pneumatic springs 4, 4' and 6, 6', respectively. The air reservoirs 7 at the same time form or serve as frame cross bearer members, the ends of which are operatively connected with the pneumatic springs disposed nearest thereto by means of appropriate lines.

As shown in FIGURE 3, the connecting lines connecting the pneumatic springs 4 and 4' with the cylinder or reservoir 7 are designated therein by reference numerals 8 and 8', respectively. The connecting lines 8 and 8' lead to the cylinder spaces 9 and 9' in the cylindrical air reservoir 7 which are separated from one another by pistons 11 and 11' which are spaced from one another by piston rod 10 and form a double-piston. An adjusting piston 12 is arranged in the center between the two pistons 11 and 11' on the piston rod 10 thereof which piston 12, in turn, separates the actuating cylinder 13 surrounding the same into two cylinder spaces 14 and 14', thus defining a fluid motor energizable from a power source such as a pump 17. The lines 15 and 15' leading from the cylinder spaces 14 and 14' to the outside through the air reservoir 7 are operatively connected with the control valve 16. The supply line 18 leads from pump 17 to the control valve 16, whereas the discharge line 19 leads from the control valve 16 to a tank or reservoir not shown in the drawing. The control valve 16 and possibly also the drive for the pump 17 are controlled or influenced by any suitable appropriate conventional means which respond to the centrifugal force occurring during the passage of the vehicle through curves. If it is assumed that in passing through a curve, the spring 4 belongs to the wheel located on the outside of the curve, then these appropriate means, which may, for example, be an inertia pendulum 16' or the like, displace the control valve 16 in such a manner that a hydraulic medium supplied by the pump 17 flows through line 18 into the line 15' and therewith into the cylinder space 14' of the cylinder 13. As a result thereof, the adjusting piston 12 mounted on the piston rod 10 is moved in the direction of the arrow 20. The hydraulic medium present in the cylinder space 14 is displaced by the piston 12 and flows off through lines 15 and 19. The pistons 11 and 11' in the air reservoir 7 are also displaced in the direction of arrow 20 together with the adjusting piston 12. The air volume present in the cylinder space 9 of the air reservoir 7 is thereby displaced through line 8 into the associated pneumatic spring 4, whereas an air volume coming from the pneumatic spring 4' flows into the cylinder space 9' over line 8'. At first, without consideration of the occurring centrifugal forces during traversal of a curve and the effect thereof on the vehicle spring system, the spring length of the pneumatic spring 4 is increased, whereas the spring volume of the pneumatic spring 4' is decreased upon movement of the pistons 11 and 11' in the direction of arrow 20 without change in volume in the pneumatic springs and without increase in pressure, insofar as any slight changes in the diametric dimension of the pneumatic bellows 4 and 4' are not considered, so that the vehicle frame not illustrated in FIGURE 3 and therewith the vehicle body will tilt toward the inside of the curve. The inclination or tilting of the vehicle frame or vehicle body toward the inside of the curve may be adjusted without great cost by the control valve 16 in such a manner that the vehicle body is subsequently readjusted horizontally by the centrifugal forces which occur during passage through curves from the previously adjusted, inclined position thereof so that the original spring height is again available in the pneumatic springs 4 and 4' for purposes of spring movements. In adjusting the vehicle body horizontally, it is meant herein that the vehicle body is adjusted to a position parallel to the road surface. Possibly the control valve 16 may also be adjusted in such a manner that, during passage through curves, a positive curve inclination of the vehicle may be obtained, i.e., the vehicle body is raised further from the road surface at the side of the car at the outside of the turn.

In case the pneumatic spring 4' is disposed along the outside of the curve, the operation described hereinabove takes place in the opposite direction.

The pneumatic springs 6 and 6' of the front axle are controlled in a manner corresponding to the control of the pneumatic springs 4 and 4' of the rear axles, whereby it is advantageous to provide a common control valve 16 for both front and rear axle members.

As shown in FIGURE 4, instead of a hydraulic actuation of the pistons 11 and 11' in the air reservoir 7, a mechanical actuation thereof may be provided which consists of a pinion 22 engaging the piston rod between the pistons 11 and 11' which is constructed as a toothed rack 21 and which displaces the pistons 11 and 11' in the one or the other direction, for example, when driven by a reversible electric motor 23. The electric motor may be controlled selectively by means of appropriate electric switches 25 and 25'. The switches are controlled automatically by means of a swinging inertia pendulum 24, for example, which will close one or the other switch 25 or 25' driving the electric motor in such a manner that a horizontal position of the vehicle body or positive curve inclination thereof is maintained while the vehicle passes through a curve.

The term "superstructure" is used herein and in the claims to designate the relatively stationary part of the vehicle such as, for instance, the vehicle frame supporting thereon the vehicle body or the vehicle body itself if constructed as a self-supporting vehicle-type body.

While we have shown and described two embodiments in accordance with the present invention, it is understood that the same is not limited thereto but is susceptible of many changes and modifications within the spirit and scope of the present invention, and we, therefore, intend to cover all such changes and modifications as are encompassed by the scope of the appended claims.

We claim:

1. A tilting control arrangement for controlling the inclination of a motor vehicle while travelling through a curve which is provided with a vehicle superstructure and axle means supporting thereon the vehicle wheels, comprising pneumatic spring means for spring supporting respective axle means with respect to said superstructure, air reservoir means including a rigid air cylinder tank operatively connecting with each other the pneumatic spring means of oppositely disposed wheels, piston means comprising a double piston having two piston surfaces interconnected by a piston rod reciprocating within said air cylinder and separating the pneumatic volume of one pneumatic spring means disposed on one vehicle side from the pneumatic volume of the pneumatic spring means disposed on the other vehicle side, a source of power on the vehicle, means including a motor energizable by said power source for displacing air on one side of said piston means from said air cylinder, and control means for controlling energization of said motor means from said power source for displacing from said air cylinder at least part of the pneumatic volume belonging to the pneumatic spring means disposed on the outer side of the curve into said last-mentioned spring means, said control means including means responsive to the centrifugal forces on said vehicle superstructure during the passage of the vehicle through said curve for controlling automatically energization of said motor means.

2. A tilting control arrangement according to claim 1, wherein said air tank cylinder is formed by a hollow frame cross-bearer member, and wherein one said hollow frame cross-bearer member each is provided for each pair of front and rear wheels in proximity to the respective axle means.

3. A tilting control arrangement for controlling the inclination of a motor vehicle while travelling through a curve which is provided with a vehicle superstructure and axle means supporting thereon the vehicle wheels, comprising pneumatic spring means for spring supporting respective axle means with respect to said superstructure, air reservoir means including a rigid air tank cylinder operatively connecting with each other the pneumatic spring means of oppositely disposed wheels, double-piston means with a piston rod within said air cylinder separating the pneumatic volume of one pneumatic spring means disposed on one vehicle side from the pneumatic volume of the pneumatic spring means disposed on the other vehicle side, a hydraulic power source on said vehicle, and actuating means energizable from said power source and operatively connected with said double-piston means for displacing from said air tank means at least part of the pneumatic volume belonging to the pneumatic spring means disposed on the outer side of the curves into said last-mentioned spring means, said actuating means including an actuating piston having two pressure faces operatively connected with said piston rod, a cylinder accommodating said actuating piston, and control means for selectively supplying a hydraulic medium from said power source to said cylinder to selectively act against one or the other of said faces and move said actuating piston in the one or other direction, said control means including means responsive to the centrifugal forces on said vehicle superstructure during passage of the vehicle through curves for automatically controlling said control means.

4. A tilting control arrangement according to claim 3, wherein said actuating piston is directly mounted on said piston rod, and said air tank cylinder surrounds said actuating piston.

5. A tilting control arrangement according to claim 4, wherein said control means includes conduit means supplying hydraulic medium from said hydraulic power source to either of said faces of said actuating piston to selectively move said actuating piston in the one or other direction, valve means selectively controlling the flow of said hydraulic medium to said faces of said actuating piston, and an inertia pendulum for operating said valve in response to the centrifugal forces acting on said vehicle superstructure during the passage of the vehicle through curves.

6. A tilting control arrangement for controlling the inclination of a motor vehicle while traveling through a curve which is provided with a vehicle superstructure and axle means supporting thereon the vehicle wheels, comprising pneumatic spring means for spring supporting respective axle means with respect to said superstructure, air reservoir means including a rigid air tank cylinder operatively connecting with each other the pneumatic spring means of oppositely-disposed wheels, double-piston means with a piston rod within said air cylinder separating the pneumatic volume of one pneumatic spring means disposed on one vehicle side from the pneumatic volume of the pneumatic spring means disposed on the other vehicle side, motor means, and actuating means operable by said motor means and operatively connected with said double-piston means for displacing from said air tank means at least part of the pneumatic volume belonging to the pneumatic spring means disposed on the outer side of the curve into said last-mentioned spring means, said actuating means including rack means on said piston rod and pinion means in meshing engagement therewith, said pinion means being operatively connected with said motor means for rotation thereby to provide movement of said double-piston means in said air tank means, and control means for selectively controlling operation of said motor means and therewith of said pinion means to move said double-piston means in one or other direction in said air tank means, said control means including means responsive to the centrifugal forces on said vehicle superstructure during passage of the vehicle through curves for automatically controlling said control means.

References Cited in the file of this patent

UNITED STATES PATENTS

| | | |
|---|---|---|
| 2,165,617 | Paes | July 11, 1939 |
| 2,703,718 | Hutchinson | Mar. 8, 1955 |
| 2,720,403 | Martin | Oct. 11, 1955 |
| 2,890,064 | Hudson | June 9, 1959 |